United States Patent
Liu

(10) Patent No.: US 11,956,755 B2
(45) Date of Patent: Apr. 9, 2024

(54) METHOD AND APPARATUS FOR TRANSMITTING PAGING SIGNALING

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 391 days.

(21) Appl. No.: 17/298,005

(22) PCT Filed: Nov. 30, 2018

(86) PCT No.: PCT/CN2018/118774
§ 371 (c)(1),
(2) Date: May 27, 2021

(87) PCT Pub. No.: WO2020/107476
PCT Pub. Date: Jun. 4, 2020

(65) Prior Publication Data
US 2022/0104168 A1    Mar. 31, 2022

(51) Int. Cl.
*H04W 68/00* (2009.01)

(52) U.S. Cl.
CPC .................. *H04W 68/005* (2013.01)

(58) Field of Classification Search
CPC .... H04W 68/00; H04W 68/02; H04W 68/025
See application file for complete search history.

(56) References Cited

U.S. PATENT DOCUMENTS

| | | | |
|---|---|---|---|
| 2002/0077124 A1 | 6/2002 | Hunzinger | |
| 2011/0090874 A1 | 4/2011 | Yang | |
| 2013/0231075 A1 | 9/2013 | Wu | |
| 2016/0128128 A1* | 5/2016 | Ang | H04W 76/28 370/311 |
| 2017/0359772 A1* | 12/2017 | Lee | H04W 68/02 |
| 2018/0262313 A1 | 9/2018 | Nam et al. | |

FOREIGN PATENT DOCUMENTS

| | | |
|---|---|---|
| CN | 101137078 A | 3/2008 |
| CN | 102223649 A | 10/2011 |
| CN | 106576261 A | 4/2017 |
| CN | 107071903 A | 8/2017 |
| CN | 108632993 A | 10/2018 |
| CN | 108702707 A | 10/2018 |
| CN | 108781425 A | 11/2018 |

(Continued)

OTHER PUBLICATIONS

International Search Report in the international application No. PCT/CN2018/118774, dated Aug. 29, 2019.

(Continued)

*Primary Examiner* — Kevin Kim
(74) *Attorney, Agent, or Firm* — Syncoda LLC; Feng Ma

(57) ABSTRACT

A method for transmitting paging signaling includes: detecting whether a channel in which a paging signaling to be sent is located is idle; when the described channel is not idle, abandoning sending the paging signaling on a preferred time domain location, and determining an alternative time domain location; and sending the paging signaling on time frequency resources of the alternative time domain location.

18 Claims, 17 Drawing Sheets

(56) References Cited

FOREIGN PATENT DOCUMENTS

| CN | 108781430 A | 11/2018 |
|---|---|---|
| WO | 2017162813 A1 | 9/2017 |

OTHER PUBLICATIONS

English translation of the Written Opinion of the International Search Authority in the international application No. PCT/CN2018/118774, dated Aug. 29, 2019.
First Office Action of the Chinese application No. 201880002499.6, dated Mar. 30, 2021.
NTT Docomo, Inc. "Initial access and mobility for NR-U operation", 3GPP TSG RAN WG1 Meeting #95 R1-1813314, Spokane, USA, Nov. 12-16, 2018.
Notice of Allowance of the Chinese application No. 201880002499.6, dated Oct. 19, 2021.

* cited by examiner

METHOD AND APPARATUS FOR TRANSMITTING PAGING SIGNALING

CROSS-REFERENCE TO RELATED APPLICATION

This application is a national stage of International Application No. PCT/CN2018/118774, filed on Nov. 30, 2018, the disclosure of which is hereby incorporated by reference in its entirety.

TECHNICAL FIELD

The present disclosure relates to the technical field of communications, and in particular to a method and apparatus for transmitting paging signaling.

BACKGROUND

In the related art, a research has been conducted on an unlicensed spectrum in 5G ($5^{th}$ Generation mobile communication system) recently, and a scheme that supports a standalone mode for an unlicensed cell in the 5G has been proposed. In the standalone mode in the 5G unlicensed spectrum, an LBT (listen before talk) rule is required to be followed. Paging signaling is transmitted at a fixed location. When a time-frequency resource at the fixed location is not idle during the LBT, there are no effective solutions currently for the problem as to how to transmit the paging signaling.

SUMMARY

Embodiments of the disclosure provide a method and apparatus for transmitting paging signaling. The technical solution includes the following aspects.

According to a first aspect of the disclosure, there is provided a method for transmitting paging signaling, the method is applied to a base station side and includes the following operations.

Whether a channel on which the paging signaling is to be transmitted is idle is detected.

In response to the channel being not idle, no paging signaling is transmitted at a primary time domain location and a candidate time domain location is determined.

The paging signaling is transmitted on a time-frequency resource at the candidate time domain location.

According to a second aspect of the disclosure, there is provided a method for transmitting paging signaling, the method is applied to user equipment side and includes the following operations.

A candidate time domain location for the paging signaling is determined.

The paging signaling is received at the candidate time domain location.

According to a third aspect of the disclosure, there is provided an apparatus for transmitting paging signaling. The apparatus includes:
   a processor;
   a memory for store instructions executable by the processor; and
   a communication component.

The processor is configured to execute the instructions to perform the following operations.

A candidate time domain location for the paging signaling is determined.

The communication component is controlled to receive the paging signaling at the candidate time domain location.

BRIEF DESCRIPTION OF THE DRAWINGS

The accompanying drawings, which are incorporated in and constitute a part of the description, illustrate embodiments consistent with the disclosure and, together with the description, serve to explain the principle of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements, unless specifically stated otherwise. The implementations set forth in the following description of embodiments do not represent all implementations consistent with the disclosure. Instead, they are merely examples of apparatuses and methods consistent with some aspects related to the disclosure as recited in the appended claims.

In the related art, a research has been conducted on an unlicensed spectrum in 5G ($5^{th}$ Generation mobile communication system) recently, and a scheme that supports a standalone mode for an unlicensed cell in the 5G has been proposed. In the standalone mode in the 5G unlicensed spectrum, an LBT (listen before talk) rule is required to be followed. Paging signaling is transmitted at a fixed location. When a time-frequency resource at the fixed location is not idle during the LBT, there are no effective solutions currently for the problem as to how to transmit the paging signaling.

In order to solve this problem, the embodiments propose a candidate time domain location, in addition to a primary time domain location, for paging signaling, which increases the opportunity and success rate of the transmission of the paging signaling.

Figure 1:
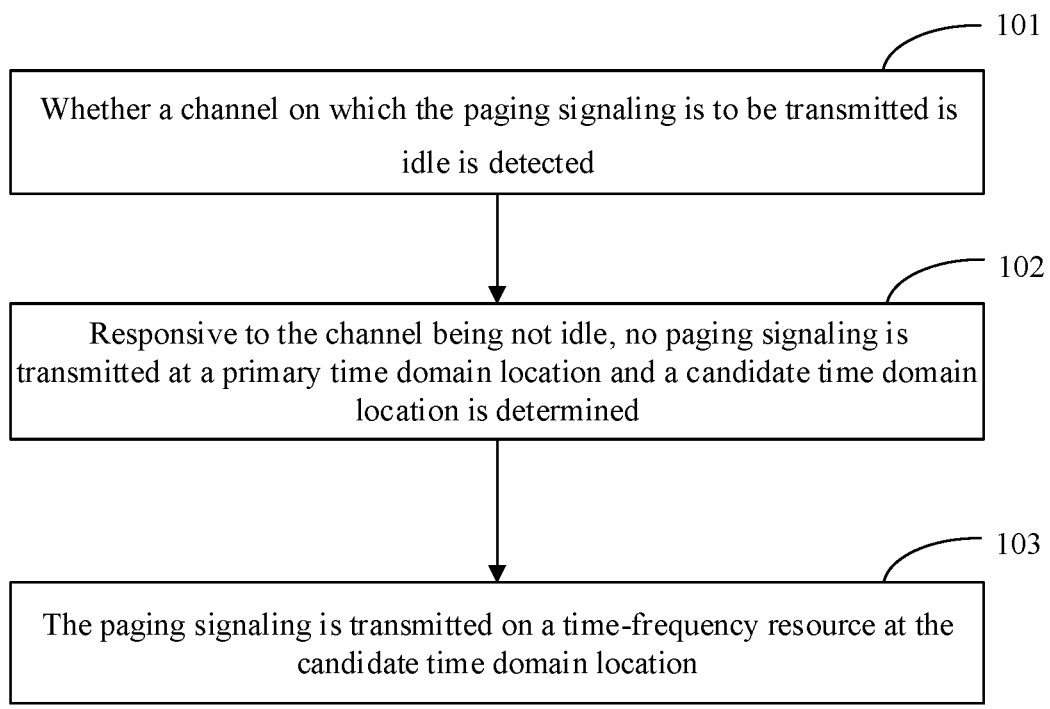
FIG. 1 is a flowchart illustrating a method for transmitting paging signaling according to an embodiment.

FIG. 1 is a flowchart illustrating a method for transmitting paging signaling according to an embodiment. The method for transmitting paging signaling is applied to an access network device such as a base station. As illustrated in FIG. 1, the method includes the following operations 101-103.

At operation 101, whether a channel on which the paging signaling is to be transmitted is idle is detected.

At operation 102, in response to the channel being not idle, no paging signaling is transmitted at a primary time domain location and a candidate time domain location is determined.

At operation 103, the paging signaling is transmitted on a time-frequency resource at the candidate time domain location.

In the embodiment, the transmission of the paging signaling in an unlicensed frequency band is also required to follow the LBT rule. According to the LBT rule, it is necessary to detect whether a channel on which the paging signaling is to be transmitted is idle before transmitting the paging signaling. Herein, the detection is the first detection for the paging signaling, and if the channel is not idle, the transmission of the paging signaling at the primary time domain location is abandoned. Then, a candidate time domain location is determined and a second detection is performed. When the next detection opportunity comes, whether the channel on which the paging signaling is to be transmitted is idle is detected (i.e., the second detection). If the channel is idle, the paging signaling is transmitted on a time-frequency resource at the candidate time domain location. If the channel is not idle during the second detection, no paging signaling may be transmitted, or a next candidate time domain location may be determined and the third detection may be performed. The number of the candidate time domain locations corresponding to one paging signaling may be pre-configured.

In an embodiment, the operation 102 includes action A1 and action A2.

At action A1, a paging window is determined based on the primary time domain location.

At action A2, the candidate time domain location is determined in the paging window.

The embodiment provides a paging window for the candidate time domain location, and uses the paging window to delimit a range for the candidate time domain location. The paging window is determined based on the primary time domain location. For example, the primary time domain location is determined as a starting location of the paging window. A size of the paging window may be configured to be fixed, and the candidate time domain location is determined in the range of the paging window.

When the paging signaling corresponds to multiple candidate time domain locations, all these candidate time domain locations are within the paging window. The size of the paging window may be 1-5 milliseconds.

In an embodiment, the method further includes operation B.

At operation B, system information or high-layer signaling is transmitted to user equipment. The system information or the high-layer signaling carries at least one of: the candidate time domain location or a size of the paging window.

In the embodiment, the system information or high-layer signaling may be transmitted before transmitting the paging signaling at the candidate time domain location. The candidate time domain location and the size of the paging window may be configured through the system information or the high-layer signaling. In the embodiment, the size of the paging window is variable, and the longer the size of the paging window, the greater the flexibility of the candidate time domain location, and the more the number of the candidate time domain locations. The location of the candidate time domain location in the paging window is also variable and may be configured more flexibly, which may improve the success rate of transmission of the paging signaling.

The system information in the embodiment may be a master system information block (MIB), a system information block (SIB), or the like. The high-layer signaling may be radio resource control (RRC) signaling or the like.

In an embodiment, the candidate time domain location and a synchronization signal/physical broadcast channel (SS/PBCH) block (SSB) are configured in a same channel occupancy time (COT), or the candidate time domain location and the SSB are configured in different COTs In the embodiment, the transmission of the SSB is also required to follow the LBT rule. When the paging signaling and the SSB are configured in the same COT, if the SSB may not be transmitted at the primary time domain location, the paging signaling may not be transmitted at the primary time domain location either. When the SSB may be transmitted at the candidate time domain location, the paging signaling may also be transmitted at the candidate time domain location. Therefore, when the candidate time domain location for the paging signaling and the SSB are configured in the same COT, the user equipment may successfully complete synchronization when the SSB is received and parsed, and receive and parse the paging signaling correctly and timely. The base station may not be required to transmit the candidate time domain location and the size of the paging window. When the candidate time domain location for the paging signaling is variable, it will change with the SSB. Therefore, the base station may not be required to transmit the candidate time domain location and the size of the paging window.

When the candidate time domain location for the paging signaling and the SSB are configured in different COTs, the base station is required to transmit the candidate time domain location and the size of the paging window before transmitting the paging signaling at the candidate time domain location. When the size of the paging window is configured to be fixed, the size of the paging window may not be transmitted at operation B. When the location of the candidate time domain location in the paging window is configured to be fixed, the candidate time domain location may not be transmitted at operation B either.

In an embodiment, the method further includes an operation C.

At operation C, a synchronization signal is transmitted to the user equipment in a paging window where the candidate time domain location is located and before the candidate time domain location.

In the embodiment, the synchronization signal is transmitted to the use equipment in the paging window where the candidate time domain location is located and before the candidate time domain location, so that the paging signaling may be received by the user equipment timely and accurately.

In an embodiment, the synchronization signal includes an SSB or a tracking reference signal (TRS).

In the embodiment, when the paging signaling and the SSB are configured in the same COT, the SSB is transmitted to the use equipment in the paging window where the candidate time domain location is located and before the candidate time domain location.

When the candidate time domain location for the paging signaling and the SSB are configured in different COTs, a TRS may be transmitted to the user equipment in the paging window where the candidate time domain location is located and before the candidate time domain location, to facilitate the synchronization of the user equipment.

When it cannot ensure that the candidate time domain location and the SSB configured by the base station are in the same COT, configuration information of the TRS is required to be transmitted to the user equipment through the system information or the high-layer signaling in advance. The user equipment may determine the time domain location for the TRS based on the configuration information. The user equipment may also know the candidate time domain location in advance. When the user equipment determines that the candidate time domain location is behind the time domain location for the TRS, the user equipment may receive the TRS before receiving the paging signaling, so as to achieve a more accurate timing.

In an embodiment, the synchronization signal includes paging group information. For example, the TRS includes the paging group information.

In the embodiment, different synchronization signal sequences represent different paging group information, respectively. Therefore, there is no need to transmit the paging group information specifically, and network resources may be saved. In addition, reception of the paging signaling through grouping may also be facilitated.

The implementation processes at the base station side will be described below in detail through several embodiments.

Figure 2:
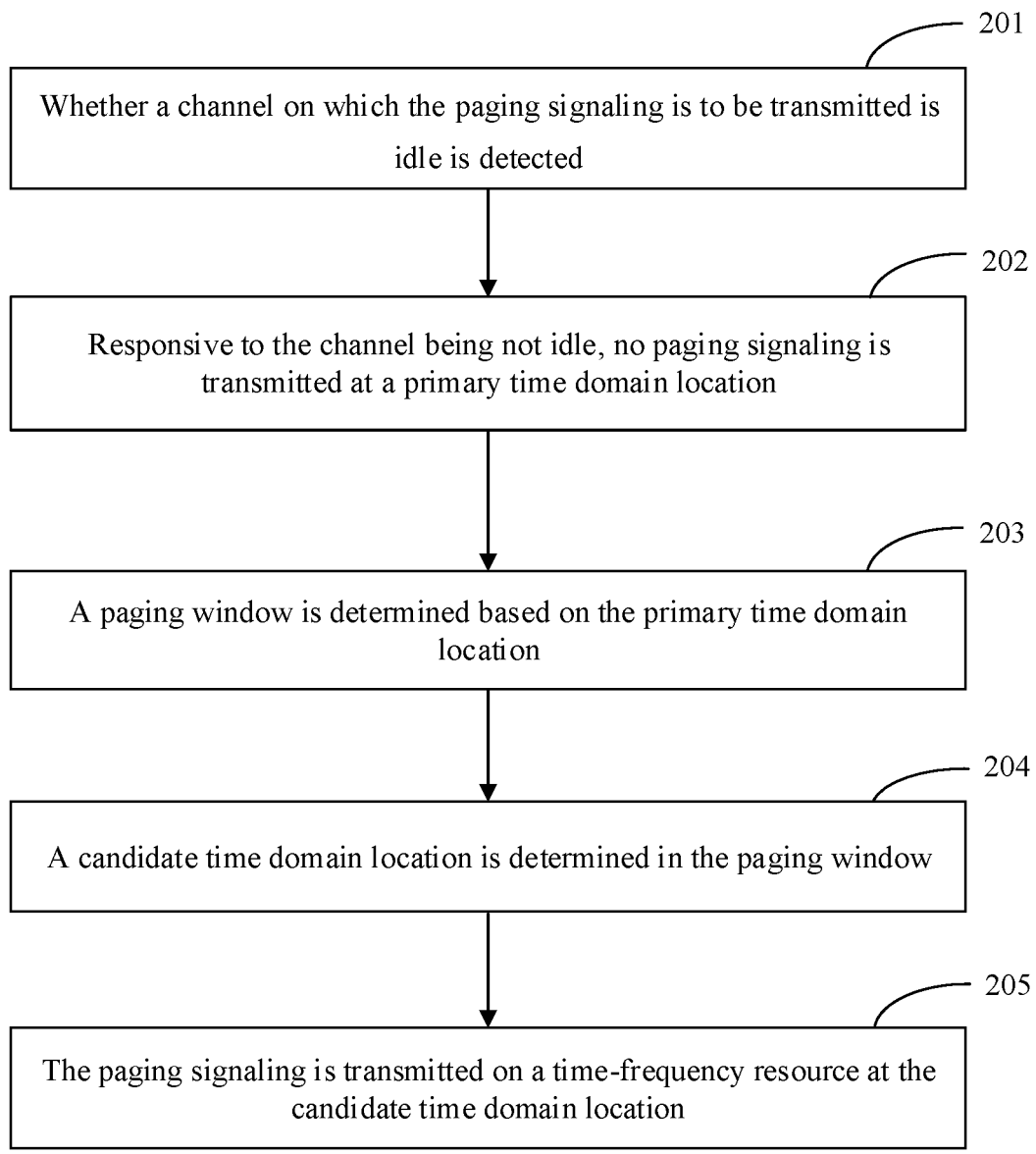
FIG. 2 is a flowchart illustrating a method for transmitting paging signaling according to an embodiment.

FIG. 2 is a flowchart illustrating a method for transmitting paging signaling according to an embodiment. The method for transmitting paging signaling is applied to an access network device such as a base station. As illustrated in FIG. 2, the method may include the following operations 201-205.

At operation 201, whether a channel on which the paging signaling is to be transmitted is idle is detected.

At operation 202, in response to the channel being not idle, no paging signaling is transmitted at a primary time domain location.

At operation 203, a paging window is determined based on the primary time domain location.

At operation 204, a candidate time domain location is determined in the paging window.

At operation 205, the paging signaling is transmitted on a time-frequency resource at the candidate time domain location.

Figure 3:
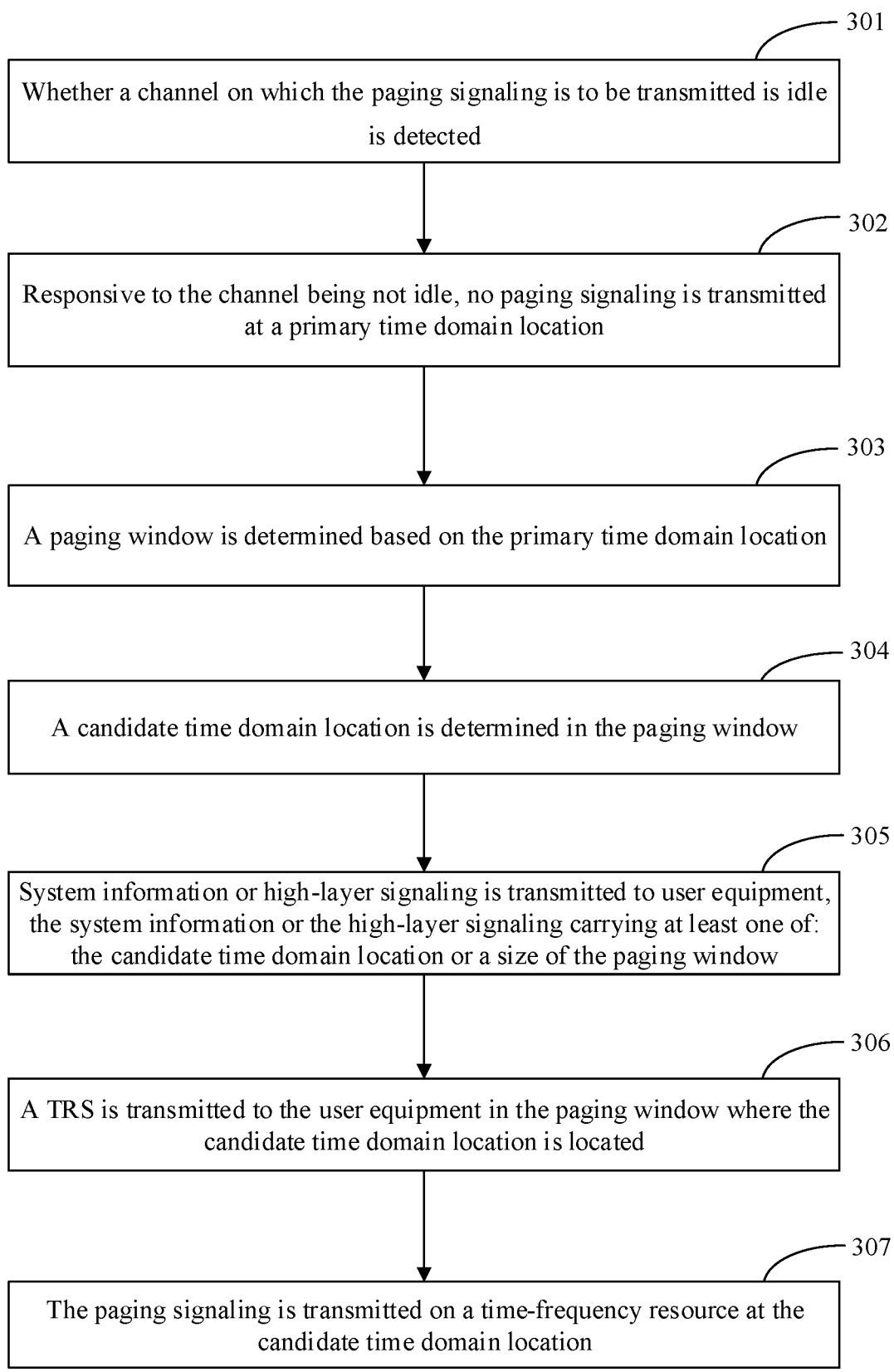
FIG. 3 is a flowchart illustrating a method for transmitting paging signaling according to an embodiment.

FIG. 3 is a flowchart illustrating a method for transmitting paging signaling according to an embodiment. The method for transmitting paging signaling is applied to an access network device such as a base station. As illustrated in FIG. 3, the method may include the following operations 301-307.

At operation 301, whether a channel on which the paging signaling is to be transmitted is idle is detected.

At operation 302, in response to the channel being not idle, no paging signaling is transmitted at a primary time domain location.

At operation 303, a paging window is determined based on the primary time domain location.

At operation 304, a candidate time domain location is determined in the paging window.

At operation 305, system information or high-layer signaling is transmitted to user equipment. The system information or the high-layer signaling carries at least one of: the candidate time domain location or a size of the paging window.

At operation 306, a TRS is transmitted to the user equipment in the paging window where the candidate time domain location is located.

At operation 307, the paging signaling is transmitted on a time-frequency resource at the candidate time domain location.

The above embodiments describe the implementation processes at the base station side. Correspondingly, the user equipment side is also improved. The implementation processes in the user equipment side will be described below.

Figure 4:
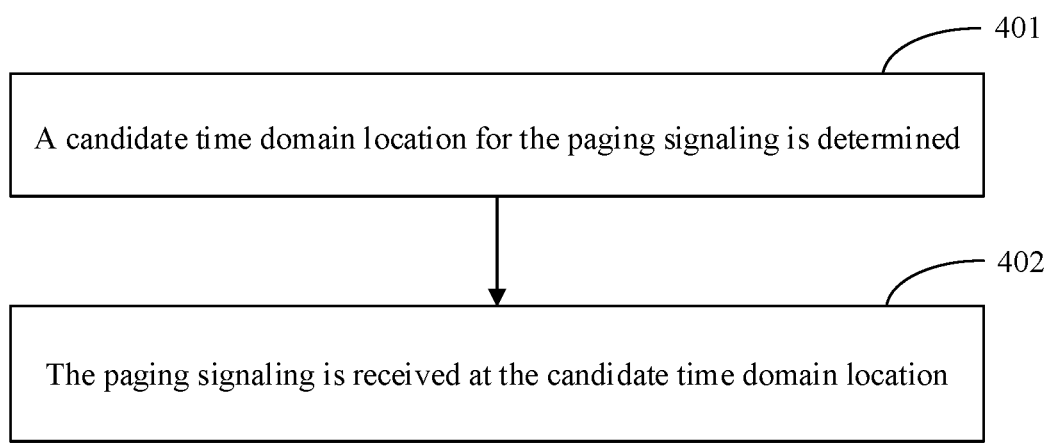
FIG. 4 is a flowchart illustrating a method for transmitting paging signaling according to an embodiment.

FIG. 4 is a flowchart illustrating a method for transmitting paging signaling according to an embodiment. The method for transmitting paging signaling is applied to user equipment. The user equipment may be a mobile phone, a computer, a digital broadcast terminal, a messaging device, a game console, a tablet device, a medical device, an exercise device, a personal digital assistant and the like. As illustrated in FIG. 4, the method includes the following operations 401-402.

At operation 401, a candidate time domain location for the paging signaling is determined.

At operation 402, the paging signaling is received at the candidate time domain location.

In the embodiment, when the user equipment does not receive the paging signaling at the primary time domain location, the candidate time domain location for the paging signaling may be determined. Then, the paging signaling is received at the candidate time domain location.

The user equipment may determine a paging window based on the primary time domain location. The location of the candidate time domain location in the paging window may be configured to be fixed, so that the user equipment may determine the candidate time domain location for the paging signaling.

In an embodiment, the operation 401 may include action D.

At action D, system information or high-layer signaling is received from a base station, and the candidate time domain location for the paging signaling is determined. The system information or the high-layer signaling carries at least one of: the candidate time domain location or a size of a paging window.

In the embodiment, both the candidate time domain location and the size of the paging window may be flexibly configured. The user equipment may determine the candidate time domain location and the size of the paging window based on the received system information or the high-layer signaling, and then determine the candidate time domain location for the paging signaling.

In an embodiment, the candidate time domain location and an SSB are configured in a same COT.

The operation 401 may include an action E.

At action E, the candidate time domain location is determined based on the SSB.

When the candidate time domain location for the paging signaling and the SSB are configured in the same COT, the user equipment may complete synchronization when receiving the SSB. Further, the candidate time domain location for the paging signaling may be determined.

When the candidate time domain location for the paging signaling and the SSB are configured in different COTs, the user equipment may receive the system information or the high-layer signaling from the base station and determine the candidate time domain location for the paging signaling.

In an embodiment, before receiving the paging signaling, the method may further include operation F.

At operation F, a synchronization signal is received from the base station in the paging window where the candidate time domain location is located and before the candidate time domain location.

In the embodiment, the synchronization signal is transmitted to the use equipment in the paging window where the candidate time domain location is located and before the candidate time domain location, so that the paging signaling may be received by the user equipment more timely and accurately.

In an embodiment, the synchronization signal includes an SSB or a TRS.

In the embodiment, when the paging signaling and the SSB are configured in the same COT, the use equipment receives the SSB in the paging window where the candidate time domain location is located and before the candidate time domain location. The synchronization may be accomplished based on the SSB.

When the candidate time domain location for the paging signaling and the SSB are configured in different COTs, a TRS may be received by the user equipment in the paging window where the candidate time domain location is located and before the candidate time domain location. The synchronization may be accomplished based on the TRS.

In an embodiment, the synchronization signal includes paging group information. For example, the TRS includes the paging group information.

In the embodiment, different synchronization signal sequences represent different paging group information, respectively. Therefore, there is no need to transmit the paging group information specifically, and network resources may be saved. In addition, reception of the paging signaling through grouping may also be facilitated.

The implementation processes at the user equipment side will be described below in detail through several embodiments.

Figure 5:
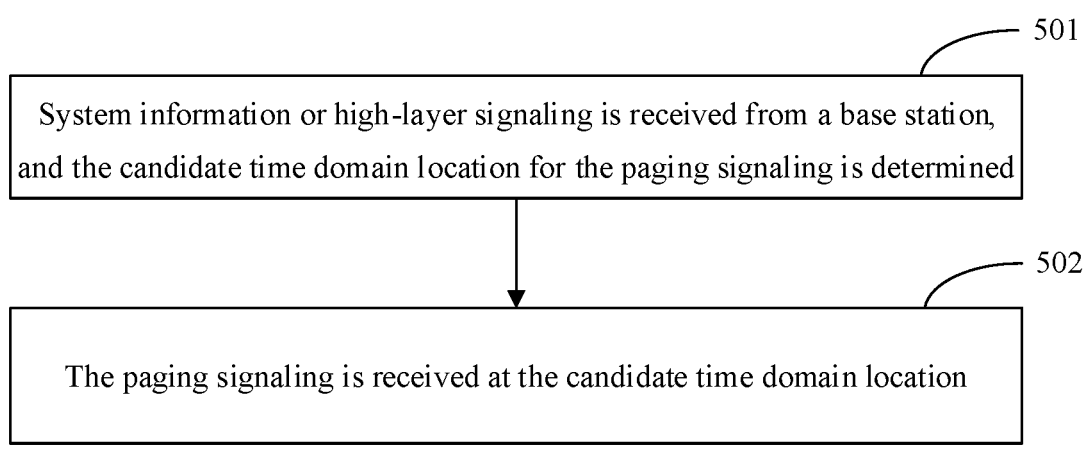
FIG. 5 is a flowchart illustrating a method for transmitting paging signaling according to an embodiment.

FIG. 5 is a flowchart illustrating a method for transmitting paging signaling according to an embodiment. The method for transmitting paging signaling is applied to user equipment. The user equipment may be a mobile phone, a computer, a digital broadcast terminal, a signaling device, a game console, a tablet device, a medical device, an exercise device, a personal digital assistant and the like. As illustrated in FIG. 5, the method may include the following operations 501-502.

At operation 501, system information or high-layer signaling is received from a base station, and the candidate time domain location for the paging signaling is determined.

At operation 502, the paging signaling is received at the candidate time domain location.

Figure 6:
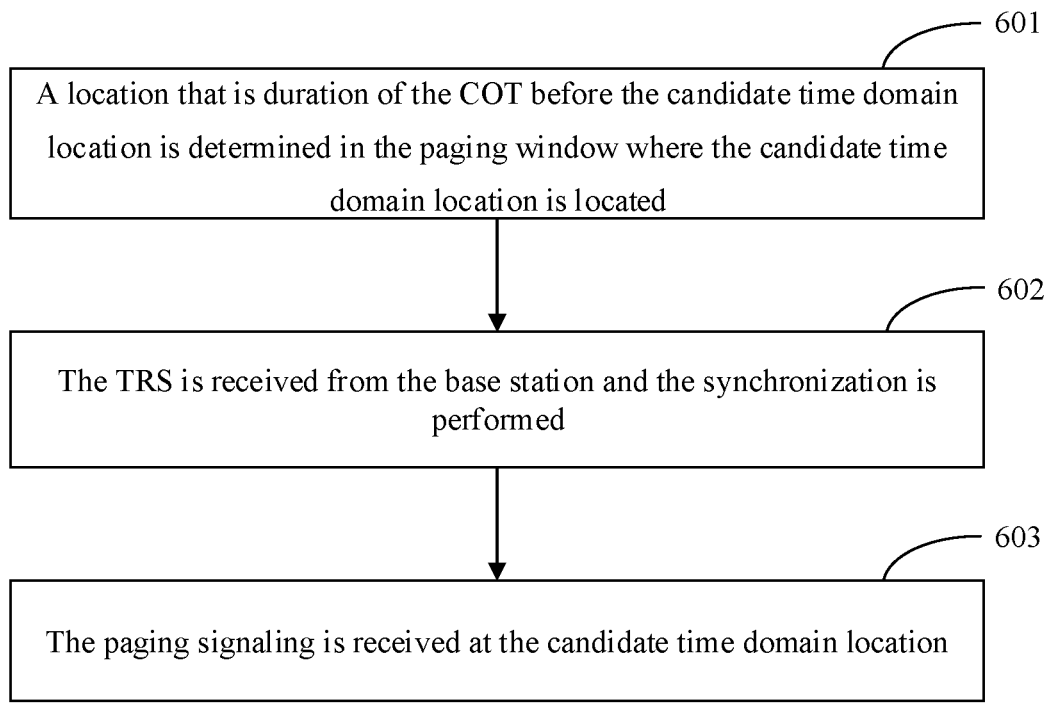
FIG. 6 is a flowchart illustrating a method for transmitting paging signaling according to an embodiment.

FIG. 6 is a flowchart illustrating a method for transmitting paging signaling according to an embodiment. The method for transmitting paging signaling is applied to user equipment. The user equipment may be a mobile phone, a computer, a digital broadcast terminal, a signaling device, a game console, a tablet device, a medical device, an exercise device, a personal digital assistant and the like. As illustrated in FIG. 6, the method may include the following operations 601-603.

At operation 601, a location that is duration of the COT before the candidate time domain location is determined in the paging window where the candidate time domain location is located.

At operation 602, the TRS is received from the base station and the synchronization is performed.

At operation 603, the paging signaling is received at the candidate time domain location.

The implementation process at both of the user equipment side and the base station side will be described below.

Figure 7:
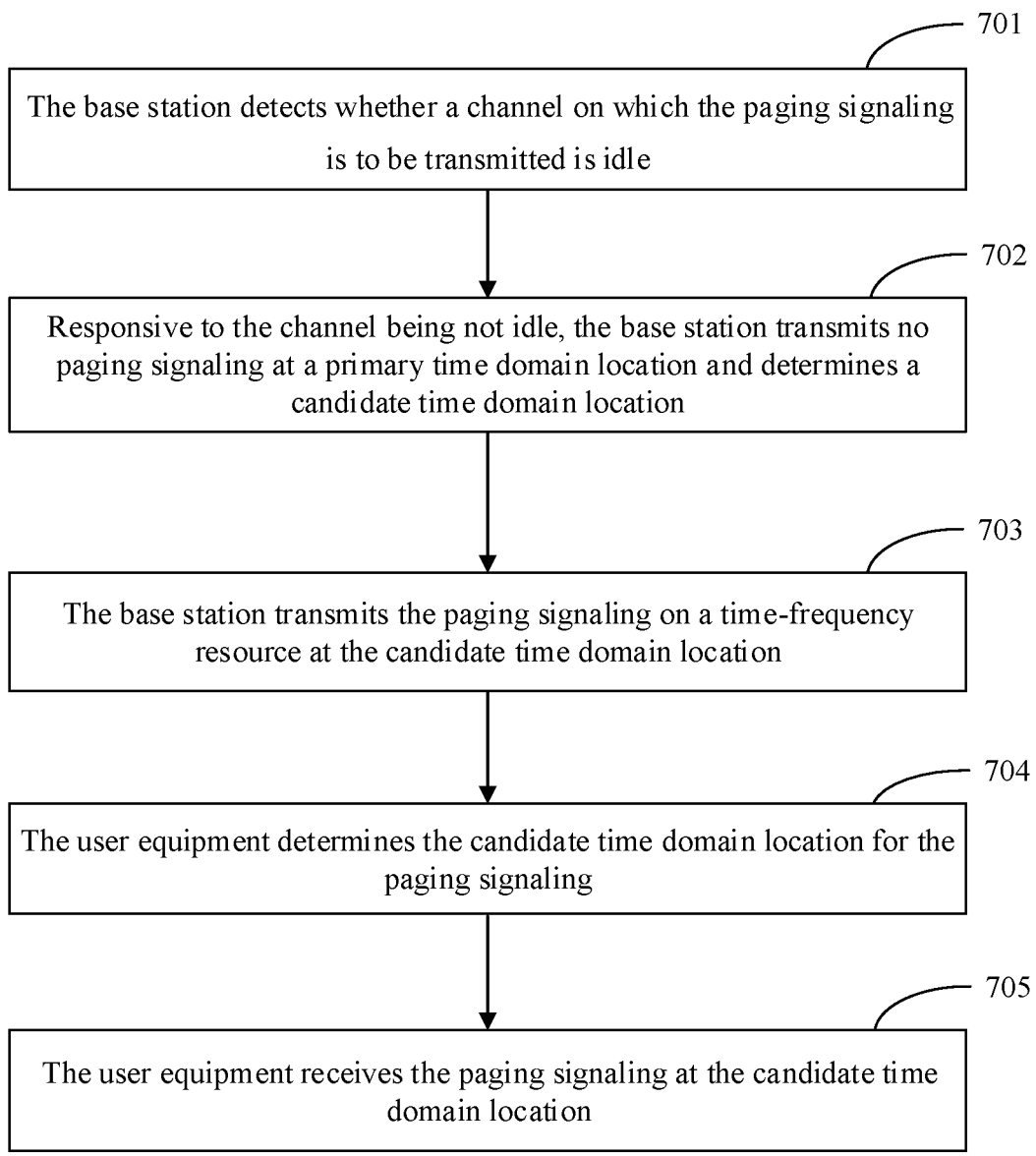
FIG. 7 is a flowchart illustrating a method for transmitting paging signaling according to an embodiment.

FIG. 7 is a flowchart illustrating a method for transmitting paging signaling according to an embodiment. As illustrated in FIG. 7, the method may include the following operations 701-705.

At operation 701, the base station detects whether a channel on which the paging signaling is to be transmitted is idle.

At operation 702, in response to the channel being not idle, the base station transmits no paging signaling at a primary time domain location and determines a candidate time domain location.

At operation 703, the base station transmits the paging signaling on a time-frequency resource at the candidate time domain location.

At operation 704, the user equipment determines the candidate time domain location for the paging signaling.

At operation 705, the user equipment receives the paging signaling at the candidate time domain location.

The above embodiments may be combined freely according to actual requirements.

The following describes embodiments of the apparatus in the disclosure, which may be used to carry out the embodiments of the methods in the disclosure.

Figure 8:
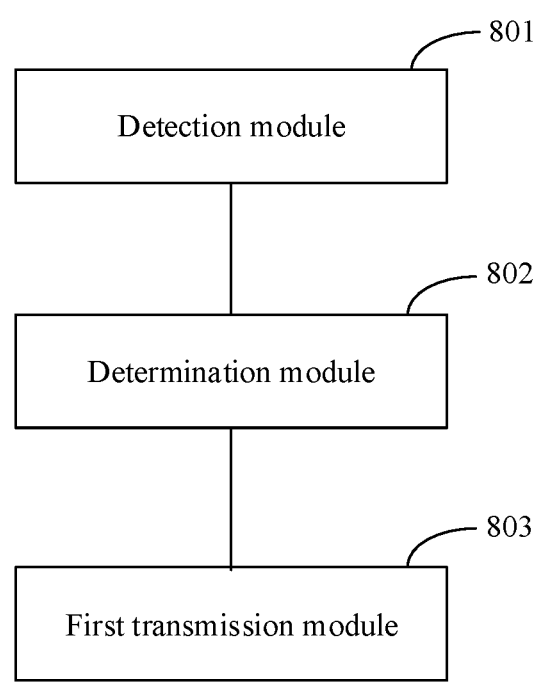
FIG. 8 is a block diagram illustrating an apparatus for transmitting paging signaling according to an embodiment.

FIG. 8 is a block diagram illustrating an apparatus for transmitting paging signaling according to an embodiment. The apparatus may be implemented as part or all of an electronic device by software, hardware, or a combination thereof. The apparatus is applied to the base station side. As illustrated in FIG. 8, the apparatus for transmitting paging signaling includes a detection module 801, a determination module 802, and a first transmission module 803.

The detection module 801 is configured to detect whether a channel on which paging signaling is to be transmitted is idle.

The determination module 802 is configured to, in response to the channel being not idle, transmit no paging signaling at a primary time domain location and determine a candidate time domain location.

The first transmission module 803 is configured to transmit the paging signaling on a time-frequency resource at the candidate time domain location.

Figure 9:
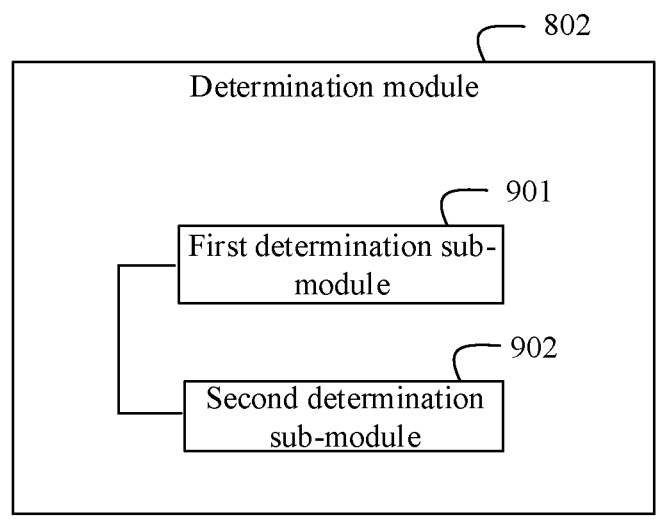
FIG. 9 is a block diagram illustrating a determination module according to an embodiment.

In an embodiment, as illustrated in FIG. 9, the determination module 802 includes a first determination sub-module 901 and a second determination sub-module 902.

The first determining sub-module 901 is configured to determine a paging window based on the primary time domain location.

The second determination sub-module 902 is configured to determine the candidate time domain location in the paging window.

Figure 10:
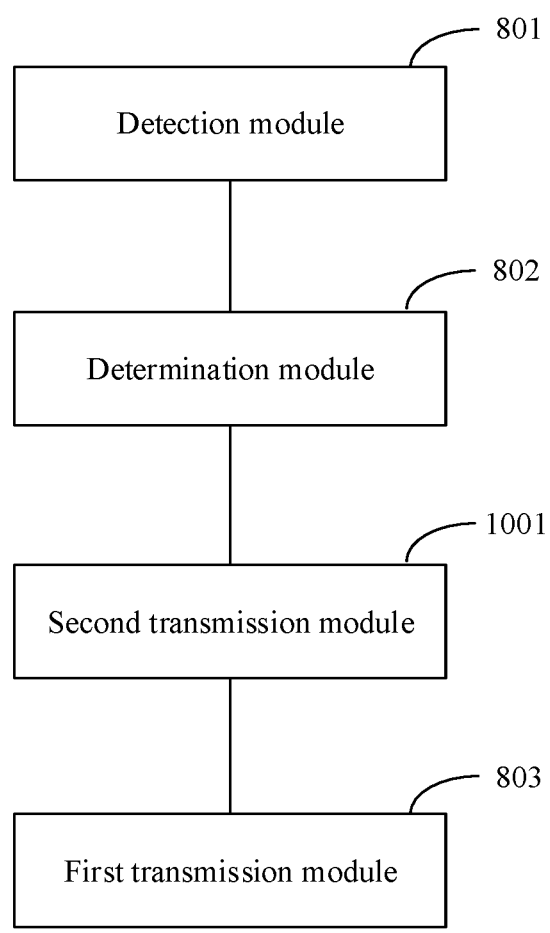
FIG. 10 is a block diagram illustrating an apparatus for transmitting paging signaling according to an embodiment.

In an embodiment, as illustrated in FIG. 10, the apparatus further includes a second transmission module 1001.

The second transmission module 1001 is configured to transmit system information or high-layer signaling to user equipment. The system information or the high-layer signaling carries at least one of: the candidate time domain location or a size of the paging window.

In an embodiment, the candidate time domain location and an SSB are configured in a same COT, or the candidate time domain location and the SSB are configured in different COTs.

Figure 11:
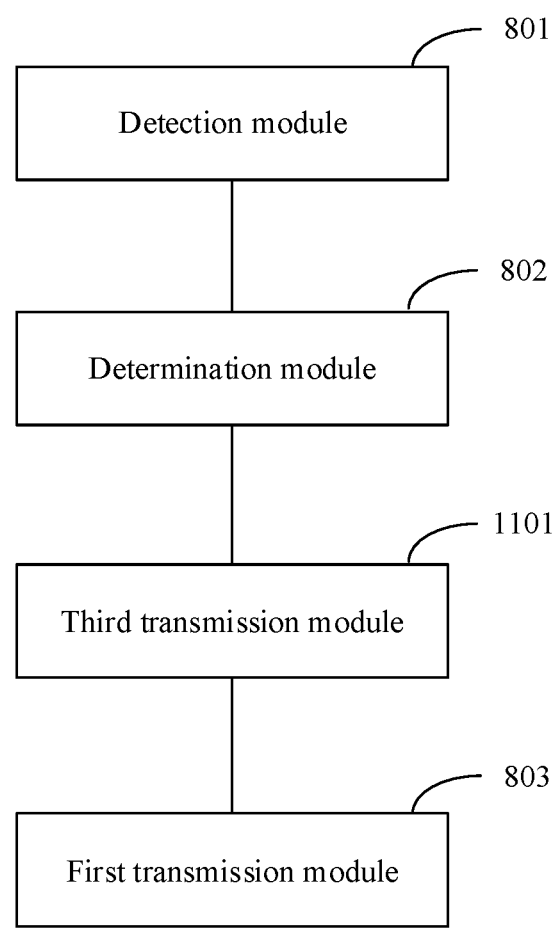
FIG. 11 is a block diagram illustrating an apparatus for transmitting paging signaling according to an embodiment.

In an embodiment, as illustrated in FIG. 11, in response to the candidate time domain location and the SSB being configured in different COTs, the apparatus may further include a third transmission module 1101.

The third transmission module 1101 is configured to transmit a TRS to user equipment in a paging window where the candidate time domain location is located and before the candidate time domain location.

In an embodiment, the TRS includes paging group information.

Figure 12:
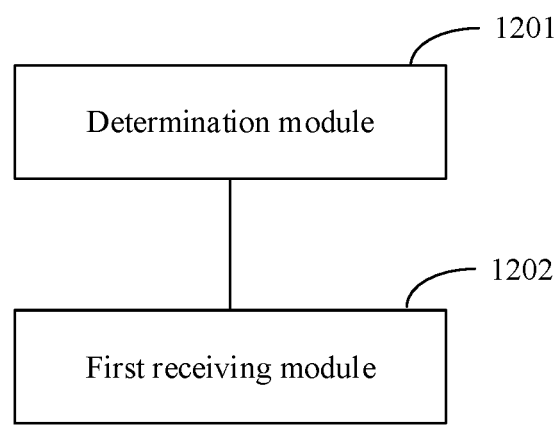
FIG. 12 is a block diagram illustrating an apparatus for transmitting paging signaling according to an embodiment.

FIG. 12 is a block diagram illustrating an apparatus for transmitting paging signaling according to an embodiment. The apparatus may be implemented as part or all of an electronic device by software, hardware, or a combination thereof. The apparatus is applied to the user equipment side. As illustrated in FIG. 12, the apparatus for transmitting paging signaling includes a determination module 1201 and a first receiving module 1202.

The determination module 1201 is configured to determine a candidate time domain location for the paging signaling.

The first receiving module 1202 is configured to receive the paging signaling at the candidate time domain location.

Figure 13:
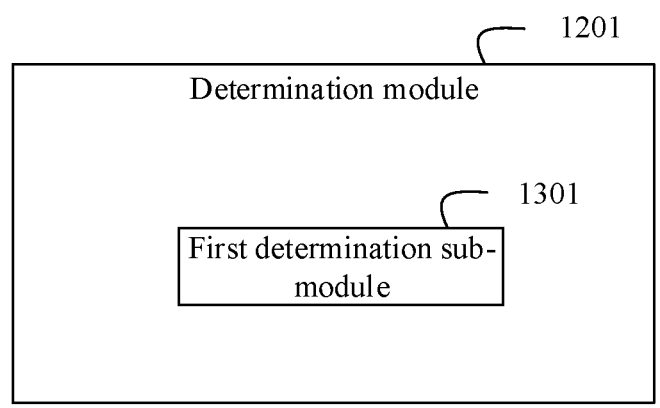
FIG. 13 is a block diagram illustrating a determination module according to an embodiment.

In an embodiment, as illustrated in FIG. 13, the determination module 1201 includes a first determination sub-module 1301.

The first determination sub-module 1301 is configured to receive system information or high-layer signaling from a base station, and determine the candidate time domain location for the paging signaling. The system information or the high-layer signaling carries at least one of: the candidate time domain location or a size of a paging window.

In an embodiment, the candidate time domain location and an SSB are configured in a same COT.

Figure 14:
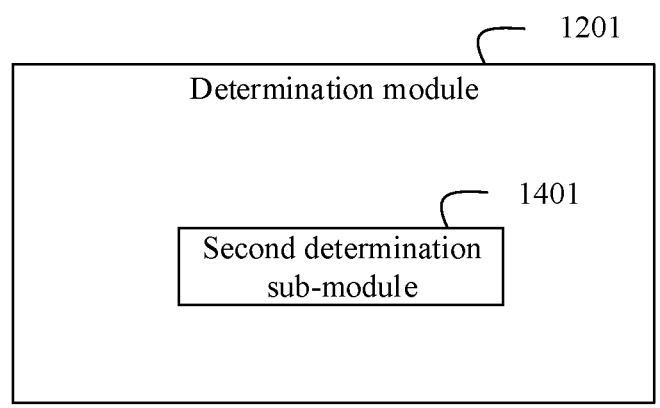
FIG. 14 is a block diagram illustrating a determination module according to an embodiment.

As illustrated in FIG. 14, the determination module 1201 includes a second determination sub-module 1401.

The second determination sub-module 1401 is configured to determine the candidate time domain location based on the SSB.

Figure 15:
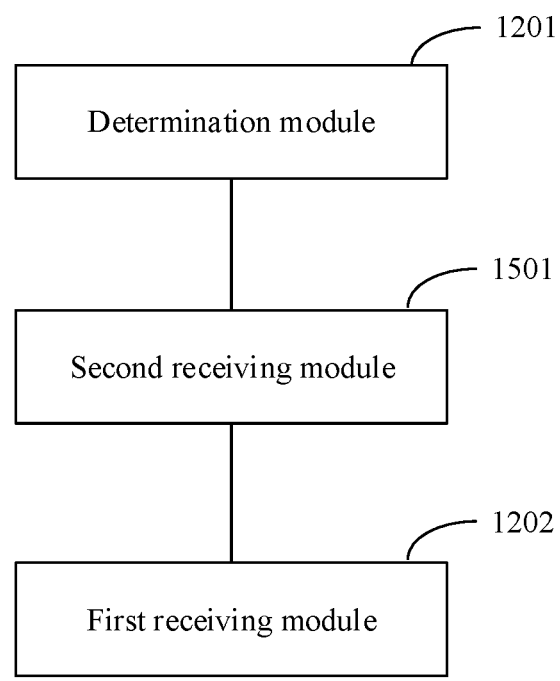
FIG. 15 is a block diagram illustrating an apparatus for transmitting paging signaling according to an embodiment.

In an embodiment, as illustrated in FIG. 15, in response to the candidate time domain location and the SSB being configured in different COTs, before receiving the paging signaling, the apparatus further includes a second receiving module 1501

The second receiving module 1501 is configured to receive a TRS from a base station in the paging window where the candidate time domain location is located and before the candidate time domain location In an embodiment, the TRS includes paging group information.

The specific manner in which various modules in the apparatus in the abovementioned embodiments perform operations has been described in detail in the embodiments related to the methods, and will not be elaborated herein.

Figure 16:
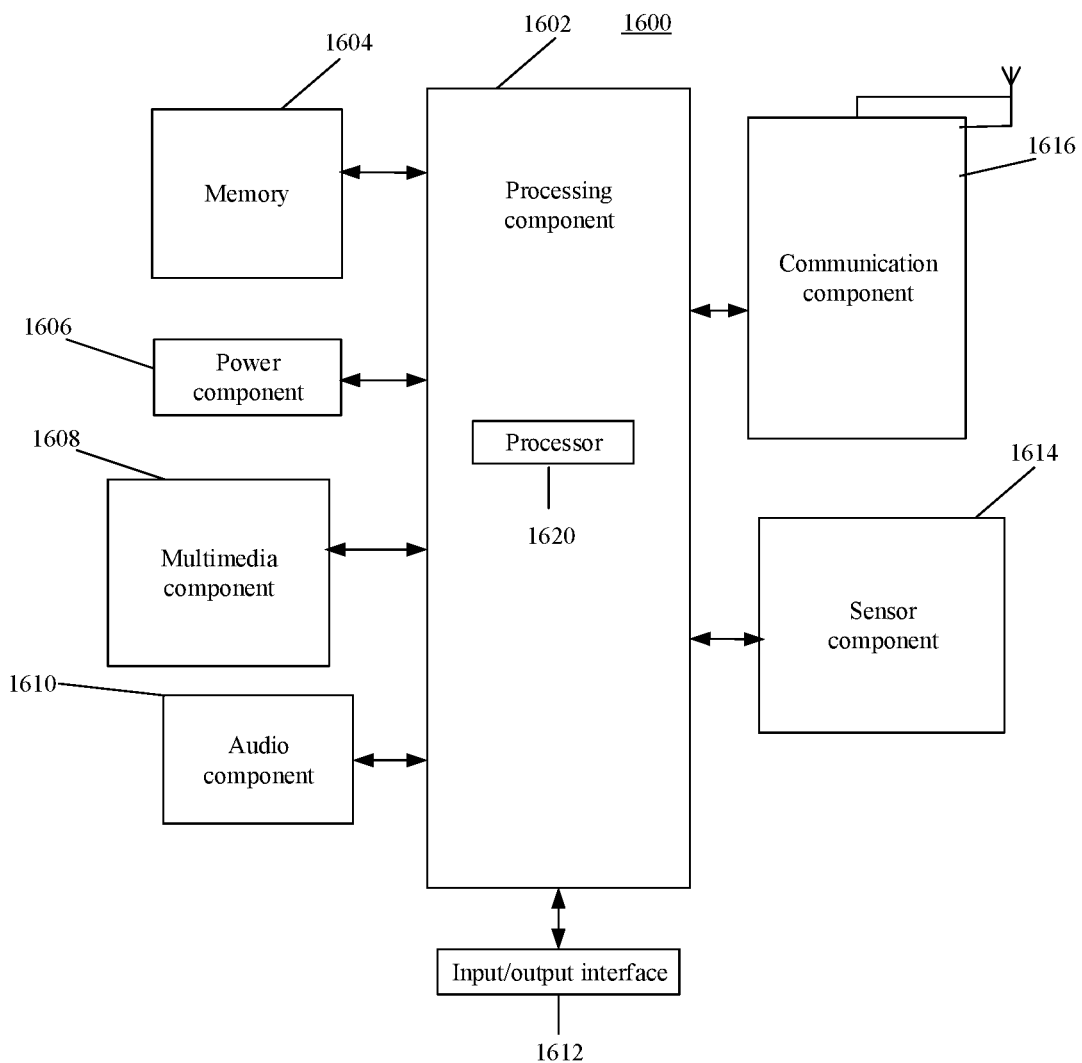
FIG. 16 is a block diagram illustrating an apparatus applicable for transmitting paging signaling according to an embodiment.

FIG. 16 is a block diagram illustrating an apparatus for transmitting paging signaling according to an embodiment. For example, the apparatus 1600 may be a mobile phone, a computer, a digital broadcast terminal, a messaging device, a game console, a tablet device, a medical device, an exercise device, a personal digital assistant, and the like.

The apparatus 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the apparatus 1600, such as the operations associated with displays, telephone calls, data communications, camera operations, and recording operations. The processing component 1602 may include one or more processors 1620 configured to execute instructions to perform all or part of the operations in the abovementioned methods. In addition, the processing component 1602 may include one or more modules which facilitate interaction between the processing component 1602 and the other components. For example, the processing component 1602 may include a multimedia module to facilitate interaction between the multimedia component 1608 and the processing component 1602.

The memory 1604 is configured to store various types of data to support operations at the apparatus 1600. Examples of such data include instructions for any applications or methods configured to operate on the apparatus 1600, contact data, phone book data, messages, pictures, video, and the like. The memory 1604 may be implemented by any type of volatile or non-volatile memory devices or a combination thereof, such as static random-access memory (SRAM), electrically erasable programmable read only memory (EEPROM), erasable programmable read-only memory (EPROM), programmable read-only memory (PROM), read-only memory (ROM), magnetic memory, flash memory, magnetic disk, or optical disk.

The power component 1606 provides power for various components of the apparatus 1600. The power component 1606 may include a power management system, one or more power supplies, and other components associated with generation, management and distribution of power for the apparatus 1600.

The multimedia component 1608 includes a screen providing an output interface between the apparatus 1600 and a user. In some embodiments, the screen may include a Liquid Crystal Display (LCD) and a Touch panel (TP). In a case where the screen includes a touch panel, the screen may be implemented as a touch screen to receive an input signal from a user. The touch panel includes one or more touch sensors to sense touches, swipes and gestures on the touch panel. The touch sensors may not only sense a boundary of a touch or swipe action, but also detect a duration and pressure associated with the touch or swipe action. In some embodiments, the multimedia component 1608 includes a front camera and/or a rear camera. When the apparatus 1600 is in an operation mode, such as a shooting mode or a video mode, the front camera and/or the rear camera may receive external multimedia data. Each of the front camera and rear camera may be a fixed optical lens system or have focusing and optical zooming capabilities.

The audio component 1610 is configured to output and/or input an audio signal. For example, the audio component 1610 includes a MIC, and the MIC is configured to receive an external audio signal when the apparatus 1600 is in the operation mode, such as a call mode, a recording mode and a voice recognition mode. The received audio signal may further be stored in the memory 1604 or sent through the communication component 1616. In some embodiments, the audio component 1610 further includes a speaker configured to output the audio signal.

The I/O interface 1612 provides an interface between the processing component 1602 and a peripheral interface module, and the peripheral interface module may be a keyboard, a click wheel, a button and the like. The button may include, but not limited to: a home button, a volume button, a starting button and a locking button.

The sensor component 1614 includes one or more sensors configured to provide status assessment in various aspects for the apparatus 1600. For instance, the sensor component 1614 may detect an on/off status of the apparatus 1600 and relative positioning of components, such as a display and small keyboard of the apparatus 1600, and the sensor component 1614 may further detect a change in a position of the apparatus 1600 or a component of the apparatus 1600, presence or absence of contact between the user and the apparatus 1600, orientation or acceleration/deceleration of the apparatus 1600 and a change in temperature of the apparatus 1600. The sensor component 1614 may include a proximity sensor configured to detect presence of an object nearby without any physical contact. The sensor component 1614 may also include a light sensor, such as a CMOS or CCD image sensor, configured for use in an imaging application. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the apparatus 1600 and another apparatus. The apparatus 1600 may access a communication-standard-based wireless network, such as a WiFi network, a 2G or 3G network or a combination thereof. In an embodiment, the communication component 1616 receives a broadcast signal from an external broadcast management system or broadcasts related information through a broadcast channel. In an embodiment, the communication component 1616 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an embodiment, the apparatus 1600 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, and is configured to execute the abovementioned methods.

In an embodiment, there is also provided a non-transitory computer-readable storage medium including an instruction, such as the memory 1604 including an instruction, and the instruction may be executed by the processor 1620 of the apparatus 1600 to implement the abovementioned method. For example, the non-transitory computer-readable storage medium may be a ROM, a Random Access Memory (RAM), a CD-ROM, a magnetic tape, a floppy disc, an optical data storage device and the like.

In an embodiment, there is provided an apparatus for transmitting paging signaling, and the apparatus includes:
 a processor; and
 a memory for storing instructions executable by the processor.

The processor is configured to perform the following operations.

A candidate time domain location for the paging signaling is determined.

The paging signaling is received at the candidate time domain location.

The processor may be further configured to perform the following operations.

The operation that a candidate time domain location for the paging signaling is determined includes the following actions.

System information or high-layer signaling is received from a base station, and the candidate time domain location for the paging signaling is determined. The system information or the high-layer signaling carries at least one of: the candidate time domain location or a size of a paging window.

The processor may further be configured to perform the following operations.

The candidate time domain location and an SSB are configured in a same COT.

The operation that the candidate time domain location for the paging signaling is determined may include the following action.

The candidate time domain location is determined based on the SSB.

The processor may further be configured to perform the following operations.

In response to the candidate time domain location and the SSB being configured in different COTs, before receiving the paging signaling, the method further includes the following operation.

A TRS is received from a base station in a paging window where the candidate time domain location is located and before the candidate time domain location.

The processor may further be configured to perform the following operation.

The TRS includes paging group information.

A computer readable storage medium having stored therein instructions which, when being executed by a processor of an apparatus, cause the apparatus to execute the abovementioned method for transmitting paging signaling. The method includes the following operations.

A candidate time domain location for the paging signaling is determined.

The paging signaling is received at the candidate time domain location.

The instructions stored in the storage medium may further include instructions for performing the following operations.

The operation that a candidate time domain location for the paging signaling is determined may include the following actions.

System information or high-layer signaling is received from a base station, and the candidate time domain location for the paging signaling is determined. The system information or the high-layer signaling carries at least one of: the candidate time domain location or a size of a paging window.

The instructions stored in the storage medium may further include instructions for performing the following operations.

The candidate time domain location and an SSB are configured in a same COT.

The operation that the candidate time domain location for the paging signaling is determined may include the following action.

The candidate time domain location is determined based on the SSB.

The instructions stored in the storage medium may further include instructions for performing the following operations.

In response to the candidate time domain location and the SSB being configured in different COTs, before receiving the paging signaling, the method further includes the follow operation.

A TRS is received from the base station in the paging window where the candidate time domain location is located and before the candidate time domain location.

The instructions stored in the storage medium may further include instructions for performing the following operations.

The TRS includes paging group information.

Figure 17:
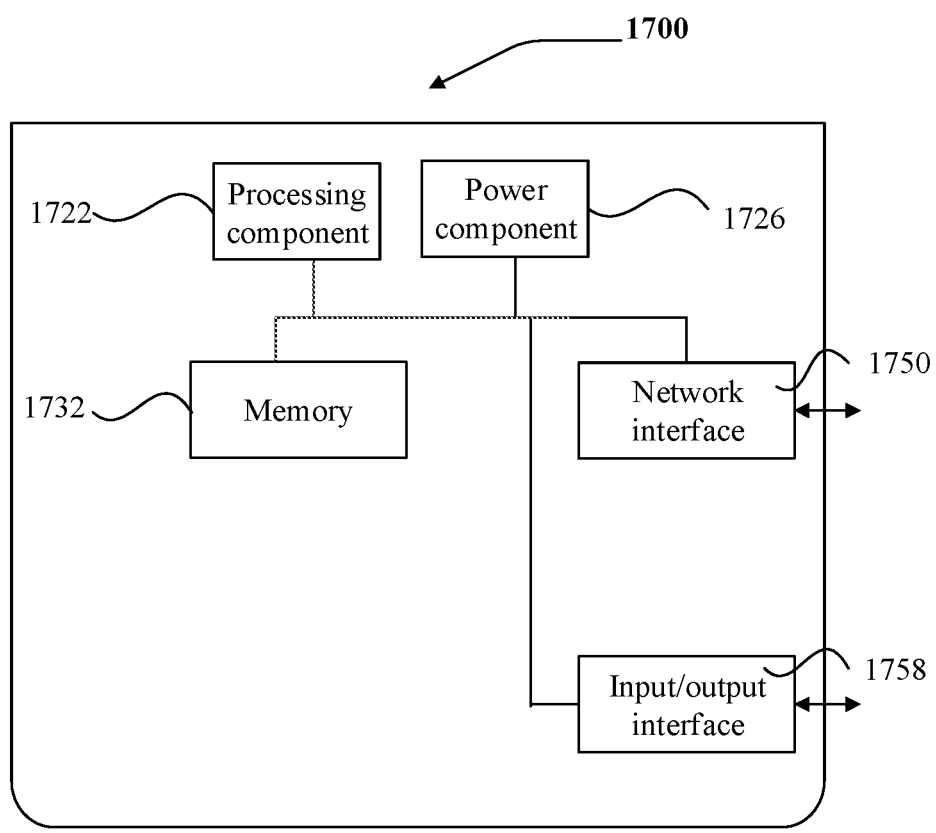
FIG. 17 is a block diagram illustrating an apparatus applicable for transmitting paging signaling according to an embodiment.

FIG. 17 is a block diagram illustrating an apparatus 1700 for transmitting paging signaling according to an embodiment. For example, the apparatus 1700 may be provided as a computer. Referring to FIG. 17, the apparatus 1700 includes a processing component 1722 that includes one or more processors, and memory resources represented by a memory 1732 configured to store instructions executable by the processing component 1722, such as an application. The application stored in the memory 1732 may include one or more modules each of which corresponds to a set of instructions. In addition, the processing component 1722 is configured to execute instructions to perform the abovementioned methods for transmitting paging signaling.

The apparatus 1700 may further include a power component 1726 configured to perform power management for the apparatus 1700, a wired or wireless network interface 1750 configured to connect the apparatus 1700 to a network, and an I/O interface 1758. The apparatus 1700 may operate an operating system stored in the memory 1732, such as Windows Server™, Mac OS X™, Unix™, Linux™, Free-BSD™, or the like.

In an embodiment, there is provided an apparatus for transmitting paging signaling, and the apparatus includes:
a processor; and
a memory for storing instructions executable by the processor.

The processor is configured to perform the following operations.

Whether a channel on which the paging signaling is to be transmitted is idle is detected.

In response to the channel being not idle, no paging signaling is transmitted at a primary time domain location and a candidate time domain location is determined.

The paging signaling is transmitted on a time-frequency resource at the candidate time domain location.

The processor may further be configured to perform the following operations.

The operation that the candidate time domain location is determined may include the following actions.

A paging window is determined based on the primary time domain location.

The candidate time domain location is determined in the paging window.

The processor may further be configured to perform the following operations.

The method may further include the following operations.

System information or high-layer signaling is transmitted to user equipment. The system information or the high-layer signaling carries at least one of: the candidate time domain location or a size of the paging window.

The processor may further be configured to perform the following operations.

The candidate time domain location and an SSB are configured in a same COT, or the candidate time domain location and the SSB are configured in different COTs.

The processor may further be configured to perform the following operations.

In response to the candidate time domain location and the SSB being configured in different COTs, the method may further include the following operations.

A TRS is transmitted to the user equipment in a paging window where the candidate time domain location is located and before the candidate time domain location.

The processor may further be configured to perform the following operations.

The TRS includes paging group information.

A computer readable storage medium having stored therein instructions which, when being executed by a processor of an apparatus, cause the apparatus to execute the abovementioned method for transmitting paging signaling. The method includes the following operations.

Whether a channel on which the paging signaling is to be transmitted is idle is detected.

In response to the channel being not idle, no paging signaling is transmitted at a primary time domain location and a candidate time domain location is determined.

The paging signaling is transmitted on a time-frequency resource at the candidate time domain location.

The instructions stored in the storage medium may further include instructions for performing the following operations.

The operation that the candidate time domain location is determined may include the following actions.

A paging window is determined based on the primary time domain location.

The candidate time domain location is determined in the paging window.

The instructions stored in the storage medium may further include instructions for performing the following operation.

The method may further include the following operation.

System information or high-layer signaling is transmitted to user equipment. The system information or the high-layer signaling carries at least one of: the candidate time domain location or a size of the paging window.

The instructions stored in the storage medium may further include instructions for performing the following operation.

The candidate time domain location and an SSB are configured in a same COT, or the candidate time domain location and the SSB are configured in different COTs.

The instructions stored in the storage medium may further include instructions for performing the following operation.

In response to the candidate time domain location and the SSB being configured in different COTs, the method may further include the following operation.

A TRS is transmitted to the user equipment in a paging window where the candidate time domain location is located and before the candidate time domain location.

The instructions stored in the storage medium may further include instructions for performing the following operation.

The TRS includes paging group information.

The technical solution provided in the embodiments of the disclosure may have the following beneficial effects. The candidate time domain location is configured for the paging signaling, and an opportunity and success rate of transmission of the paging signaling may be increased. The paging window is used to delimit a range for the candidate time domain location, and the candidate time domain location is determined in the range, so that a timely transmission of the paging signaling may be ensured as much as possible. The candidate time domain location and the size of the paging window are configured through the system information or high-layer signaling, so that the user equipment may receive the paging signaling more timely and accurately. There may be several location relationships between the candidate time domain location for the paging signaling and the SSB, so that multiple application scenarios may be adapted. The TRS is transmitted before transmitting the paging signaling, so that the paging signaling may be received by the user equipment timely and accurately. The TRS may carry the paging group information, so that network resources may be saved.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting paging signaling, applied to a base station side, the method comprising:
   detecting whether a channel on which the paging signaling is to be transmitted is idle;
   in response to the channel being not idle, transmitting no paging signaling at a primary time domain location and determining a candidate time domain location; and
   transmitting the paging signaling on a time-frequency resource at the candidate time domain location.

2. The method of claim 1, wherein determining the candidate time domain location comprises:
   determining a paging window based on the primary time domain location; and
   determining the candidate time domain location in the paging window.

3. The method of claim 2, further comprising:
   transmitting system information or high-layer signaling to user equipment, wherein the system information or the high-layer signaling carries at least one of: the candidate time domain location or a size of the paging window.

4. The method of claim 1, wherein the candidate time domain location and a synchronization signal/physical broadcast channel (SS/PBCH) block (SSB) are configured in a same channel occupancy time (COT), or the candidate time domain location and the SSB are configured in different COTs.

5. The method of claim 4, wherein in response to the candidate time domain location and the SSB being configured in different COTs, the method further comprises:
   transmitting a tracking reference signal (TRS) to user equipment in a paging window where the candidate time domain location is located and before the candidate time domain location.

6. The method of claim 5, wherein the TRS comprises paging group information.

7. A method for transmitting paging signaling, applied to a user equipment side, the method comprising:
   receiving system information or high-layer signaling from a base station, and determining a candidate time domain location for the paging signaling, wherein the system information or the high-layer signaling carries at least one of: the candidate time domain location or a size of a paging window; and
   receiving the paging signaling at the candidate time domain location.

8. The method of claim 7, wherein the candidate time domain location and a synchronization signal/physical broadcast channel (SS/PBCH) block (SSB) are configured in a same channel occupancy time (COT); and
   determining the candidate time domain location for the paging signaling comprises:
   determining the candidate time domain location based on the SSB.

9. The method of claim 7, wherein in response to the candidate time domain location and a synchronization signal/physical broadcast channel (SS/PBCH) block (SSB) being configured in different COTs, before receiving the paging signaling, the method further comprises:
   receiving a tracking reference signal (TRS) from the base station in the paging window where the candidate time domain location is located and before the candidate time domain location.

10. The method of claim 9, wherein the TRS comprises paging group information.

11. An apparatus for transmitting paging signaling, applied to a user equipment side, the apparatus comprising:
    a processor;
    a memory for storing instructions executable by the processor; and
    a communication component;
    wherein the processor is configured to execute the instructions to:
    control the communication component to receive system information or high-layer signaling from a base station, and determine a candidate time domain location for the paging signaling, wherein the system information or the high-layer signaling carries at least one of: the candidate time domain location or a size of a paging window; and
    control the communication component to receive the paging signaling at the candidate time domain location.

12. The apparatus of claim 11, wherein the candidate time domain location and a synchronization signal/physical broadcast channel (SS/PBCH) block (SSB) are configured in a same channel occupancy time (COT); and
    the processor is further configured to:
    determine the candidate time domain location based on the SSB.

13. The apparatus of claim 11, wherein the processor is further configured to:
    in response to the candidate time domain location and a synchronization signal/physical broadcast channel (SS/PBCH) block (SSB) being configured in different COTs, before receiving the paging signaling, receive a tracking reference signal (TRS) from the base station in the paging window where the candidate time domain location is located and before the candidate time domain location.

14. The apparatus of claim 13, wherein the TRS comprises paging group information.

15. A communication system implementing the method of claim 1, comprising the base station, wherein the candidate domain is configured as an alternative time domain additional to the primary time domain, to thereby increase opportunities and success rate for transmitting the paging signaling.

16. The communication system of claim 15, further comprising user equipment configured to:
- determine the candidate time domain location for the paging signaling; and
- receive the paging signaling at the candidate time domain location.

17. The communication system of claim 15, wherein the user equipment is configured to determine the candidate time domain location for the paging signaling by:
- receiving system information or high-layer signaling from the base station, and determining the candidate time domain location for the paging signaling, wherein the system information or the high-layer signaling carries a size of a paging window to thereby delimit a range for the candidate time domain location, wherein the candidate time domain location is determined in the range, to thereby ensure timely transmission of the paging signaling.

18. The communication system of claim 15, wherein
- the candidate time domain location and a synchronization signal/physical broadcast channel (SS/PBCH) block (SSB) are configured in a same channel occupancy time (COT);
- the user equipment is configured to determine the candidate time domain location for the paging signaling by: determining the candidate time domain location based on the SSB; and
- multiple location relationships between the candidate time domain location for the paging signaling and the SSB are provided, to thereby facilitate multiple application scenarios.

\* \* \* \* \*